United States Patent Office 3,775,299
Patented Nov. 27, 1973

3,775,299
CATALYTIC CRACKING WITH CATALYST OF ZEOLITE IN WEIGHTED MATRIX
Leonard S. Hepner, Haddonfield, N.J., assignor to Mobil Oil Corporation
No Drawing. Original application Apr. 13, 1970, Ser. No. 27,992, now Patent No. 3,717,587. Divided and this application Nov. 18, 1971, Ser. No. 200,232
Int. Cl. C01b *33/28;* C10g *11/04*
U.S. Cl. 208—120                                    10 Claims

ABSTRACT OF THE DISCLOSURE

New catalyst for hydroconversion of organic feedstocks and method of preparing such catalyst. Catalyst comprises an inorganic oxide gel matrix having dispersed therein a crystalline aluminosilicate zeolite. Matrix is treated, prior to heat ageing, with acid to adjust the molar ratio of $OH/SiO_2$ to from about 0.18 to 0.21. The catalyst exhibits superior low coking tendencies.

---

This application is a division of application Ser. No. 27,992, filed Apr. 13, 1970, now U.S. Pat. 3,717,587.

BACKGROUND OF THE INVENTION

(1) Field of the invention

This invention pertains to the field of catalytic compositions and methods for preparation and use thereof. More particularly, this invention pertains to a novel crystalline aluminosilicate zeolite catalyst and to a method of preparing such catalyst.

(2) Discussion of the prior art

One of the recent major advances in catalyst technology was the discovery that catalytic compositions possessing both high activity and selectivity as well as superior attrition resistance in hydrocarbon conversion processing could be obtained by dispersing a crystalline aluminosilicate zeolite in an inorganic oxide gel matrix. Such compositions have been described, e.g., in U.S. Pats. 3,140,249 and 3,140,253 of C. J. Plank and E. J. Rosinski. It has further been found that certain desirable properties of such catalysts, including stability and activity, could be improved by replacing the alkali metals contained in the zeolites with other metals, particularly those of the rare earth group, and also by various pretempering treatments, e.g., steaming and dry thermal calcining.

SUMMARY OF THE INVENTION

I have discovered a new catalytic composition for use in the catalytic cracking of hydrocarbon oils and a method for preparation and use thereof, which composition exhibits decreased carbon deposition during use. My catalyst comprises a crystalline aluminosilicate, preferably carrying rare earth metal cations (hereinafter sometimes referred to as a rare earth zeolite), dispersed in an inorganic oxide gel matrix. The inorganic oxide gel matrix is made up of silica, silica-alumina, silica-zirconia, or silica-zirconia-alumina gel, desirably along with a weighting agent, preferably clay. In accordance with my invention, prior to heat ageing of the matrix, the matrix-forming material is treated with an acid in such amount as to adjust the ratio of moles of hydroxide per mole of silica (hereinafter described and referred to as $OH/SiO_2$ molar ratio) in the matrix to from about 0.18 to 0.21.

The composite catalysts of my invention exhibit superior selectivity and are particularly desirable because of their ability to crack hydrocarbons to relatively high yields of gasoline while having low coking tendencies (hereinafter sometimes referred to as "coke make"). This is of great value when dealing with "dirty" feedstocks, e.g., heavy gas oils and "recycle" stocks, which ordinarily give off appreciable coke yields when subjected to cracking.

DESCRIPTION OF THE PREFERRED EMBODIMENTS

The composite catalyst of my invention comprises crystalline aluminosilicate particles, desirably having rare earth cations therein, these particles being contained in a porous inorganic oxide gel matrix, the matrix comprising an inorganic oxide gel, e.g., silica, silica-alumina, silica-zirconia, or silica-zirconia-alumina gel, desirably along with a weighting agent. The alkali metal content of the matrix, prior to ageing of the matrix, is partially neutralized so as to adjust the $OH/SiO_2$ molar ratio of the matrix to from about 0.15 to about 0.23 and preferably from about 0.18 to about 0.21.

The initial $OH/SiO_2$ molar ratio designates the number of moles of hydroxide which would be obtained upon hydrolysis of the alkali metal silicate used to prepare the matrix, divided by the total moles of $SiO_2$ in said alkali metal silicate. For example, when the alkali metal silicate used to prepare the matrix is "Q" or "N" brand sodium silicate having the formula $Na_2O \cdot (SiO_2)_{3.3}$, this silicate would yield on hydrolysis two moles of NaOH per 3.3 moles of $SiO_2$, giving an initial $OH/SiO_2$ molar ratio of 0.606. Of course, for any given commercial source of sodium silicate one can readily calculate the molar ratio of OH to $SiO_2$ (assuming complete hydrolysis of sodium oxide to NaOH).

In accordance with my invention, I partially neutralize a desired molar amount of the hydroxide by the addition of acid. Thus, by dividing the total number of moles of hydroxide remaining unneutralized *after* the addition of the acid by the total number of moles of $SiO_2$, the $OH/SiO_2$ molar ratio is obtained.

The inorganic oxide gel should have a pore volume of at least 0.6 cc. per gram. The weighting agent employed as a component of the matrix should be present in such an amount as to yield a resulting catalytic composition having a packed density of at least 0.3 gram per cc. (It is to be understood that when reference is made herein to properties of the composite such as, e.g., packed density, or to properties of the silica gel, silica-alumina, silica-zirconia or silica-zirconia-alumina gel such as, e.g., pore volume, these references are to the fresh catalyst composite, i.e., to the composite prior to its actual use in catalytic conversion, but subsequent to the removal of water therefrom, as by heating to a temperature of 1200° F. for three hours in substantially dry air.)

Referring to the synthetic amorphous gel, i.e., silica, silica-alumina, silica-zirconia or silica-zirconia-alumina gel of the catalyst matrix, as previously noted, such synthetic amorphous gel should desirably have a pore volume of at least 0.6 cc. per gram. In general, the higher the pore volume, the more desirable is the overall composite catalyst, of course, provided that the pore volume is not so high as to adversely affect the attrition resistance of the catalyst. Thus, the pore volume of the synthetic amorphous gel is generally from about 0.6 to 1.5 cc. per gram, a more preferred range being from about 0.8 to 1.3 cc. per gram. The most preferable pore volume range is from about 1 to 1.2 cc. per gram.

In addition, and as will be discussed in greater detail hereinafter, it is advantageous that the synthetic amorphous gel be such that, if used alone, it would be characterized by substantially no catalytic activity. By "substantially no catalytic activity" we mean that the alpha ($\alpha$) value (defined in detail hereinafter) for the synthetic amorphous gel is less than 0.1, and desirably less than 0.05.

The matrix for my composite catalyst desirably also includes a weighting agent. The most preferred weighting agent is kaolin clay. Other weighting agents may be substituted, in whole or in part, for kaolin clay, so long as such weighting agents do not react with the high porosity silica gel to form compounds that would cause an appreciable change in the pore volume-surface area relationship of the finished catalyst. Other suitable weighting agents include zircon, alpha alumina, mullite, alumina monohydrate, alumina trihydrate, halloysite, sand, $TiO_2$, silicon, metals such as aluminum and titanium, etc. Where a weighting agent is employed, the amount of agent employed desirably should be such that the final composite catalyst has a packed density of at least 0.3 gram per cc. Generally the packed density of the composite catalyst will be from about 0.3 to 1 gram per cc., a more preferred range being from about 0.4 to 0.6 gram per cc.

The mean particle size of the weighting agent which may be incorporated as one component of the matrix is desirably less than about 40 microns. Preferably the particle size is from about 0.1 to 20, and most preferably from about 2 to 10 microns.

In the make up of the matrix, the relative proportions as between the synthetic amorphous gel and weighting agent are advantageously from about 20 to 95% by weight of synthetic amorphous material and from about 5 to 80% by weight of weighting agent. A more preferred range is one wherein the synthetic amorphous material is from about 50 to 70 weight percent of the matrix and the weighting agent is from about 30 to 50 weight percent of the matrix.

Crystalline aluminosilicate particles are dispersed in the foregoing matrix, generally in such quantity that the overall composite contains from about 1 to 80 percent by weight of such crystalline aluminosilicate particles. Preferably, the composite will contain from about 2 to 20 percent by weight of crystalline aluminosilicate particles, the most preferred range being from about 5 to 15 percent by weight.

To prepare my composite catalyst, the particulate weighting agent is dispersed in liquid medium, preferably water, to form a dispersion. Advantageously the concentration of weighting agent in the dispersion is from about 0.5 to 10 percent by weight, and most preferably from about 1 to 3 percent by weight. The foregoing dispersion is intimately admixed with an alkali metal silicate. Thus, aqueous alkali metal silicate may be slowly added to the weighting agent dispersion with thorough mixing. The mixing is conveniently carried out at room temperature, although if desired, lower or higher temperatures may be employed. The relative proportions as between the weighting agent dispersion and alkali metal silicate solution are not critical, and merely require that there be present sufficient alkali metal silicate to assure that the particles of weighting agent are coated therewith. Hence, the mixing is thorough so as to insure that the clay is uniformly dispersed and coated with alkali metal silicate.

After mixing, the admixture is heated to a temperature from about 70 to 150° F. and then a strong acid, preferably $H_2SO_4$, is added to the admixture with mixing, in an amount sufficient to produce an $OH/SiO_2$ molar ratio, as described hereinabove, of from about 0.18 to 0.21. Preferably, the acid is added at a uniform rate over a given period, e.g., from about one-half hour up to about six hours.

The admixture is then heated to a temperature of from about 90 to about 200° F. and maintained at this temperature for about 0.5 to 6 hours. Longer ageing times may be employed, but to no particular advantage. As will be apparent, in general, the higher the temperature, the less time required at that temperature to effect aging. Thus, the ageing could be carried out at temperatures as low as, e.g., room temperature, but then the time requirements for such ageing would be considerable so that the process would be uneconomical.

If a silica-alumina, silica-zirconia, or silica-zirconia-alumina gel is to be employed rather than silica gel, suitable sources of aluminum and/or zirconium ions are added after the ageing step.

In one embodiment of the present invention, a source of aluminum ions is added to the aged admixture, generally in amounts sufficient to give from about 0.3 to 1.0 percent by weight $Al_2O_3$ in the final catalyst, on a dry basis. The alumina is typically added in the form of an aluminum salt, preferably aluminum sulfate.

Neither the concentration nor the amount of aluminum salt solution employed is critical. Thus, each may be adjusted so as to achieve the desired level of alumina in the overall amorphous gel-weighting agent matrix. By way of illustration, the concentration of the aluminum salt solution may be of the order of 1 percent by weight to 30 percent by weight or even higher, a preferred range being from about 5 to 20 percent by weight, the most preferred range being from about 10 to 15 percent by weight.

Likewise, the temperature of the aluminum salt solution is not at all critical. It is generally most convenient to make up the solution at ambient temperature conditions and then add it to the aged admixture, although higher or lower temperatures may, of course, be employed. The presence of the alumina in the catalyst tends to improve the filterability of the catalyst slurry, as discussed in detail hereinafter.

As mentioned hereinabove, the presence of the alumina in prior art catalysts, while necessary to improve the filterability thereof, had the disadvantage of increasing the coke make of the catalyst. In that embodiment of the present invention wherein alumina is used, however, virtually no increase in coke make occurs.

The catalyst of my invention may also comprise a catalyst wherein the matrix is silica-zirconia gel or silica-zirconia-alumina gel rather than silica-alumina gel or silica gel alone. In preparing such catalysts, a source of zirconium ions is added to the admixture after the foregoing ageing step. If the matrix is also to contain an alumina gel, the source of aluminum ions also may be added, as described hereinabove. The source of zirconium ions desirably is a zirconium salt, zirconium sulfate or acidified sodium zirconium silicate being preferred. An aqueous solution of the zirconium salt is advantageously employed.

Neither the concentration nor the amount of salt solution employed is critical. Thus, each may be adjusted so as to achieve the desired level of zirconia in the overall matrix. By way of illustration, the concentration of the zirconium salt solution may be of the order of 1 percent by weight to 30 percent by weight or even higher, a preferred range being from about 5 to 20 percent by weight, the most preferred range being from about 10 to 15 percent by weight.

Likewise, the temperature of the zirconium salt solution is not at all critical. It is generally most convenient to make up the solution at ambient temperature conditions and then add it to the aged admixture, although higher or lower temperatures may, of course, be employed.

Where zirconia is to be present as a component of the matrix, it is desirable that the zirconia level of the synthetic amorphous gel be from about 0.5 to 25 percent by weight on a dry basis. A more preferred range is from about 1 to 10 percent, with the most preferred range being from about 2 to 5 percent. As previously pointed out, the desired zirconia level is readily obtained by appropriate selection of concentration and/or amount of zirconium salt solution employed.

After the heat-ageing step, and the addition of any aluminum or zirconium salts, sufficient acid (desirably sulfuric) is added to the slurry, with agitation, to reduce the pH from a higher value, such as in the range of 9 to 10.5, to a pH in the approximate range of 4 to 7. Preferably the pH is reduced to from about 4.0 to 5.0, with from about 4.4 to 4.6 being the most preferred range.

This addition of acid at this point results in the formation of a synthetic amorphous gel oxide-weighting agent matrix slurry wherein the gel is characterized on a dry basis, by a pore volume of at least 0.6 cc./gram.

To the foregoing synthetic amorphous oxide gel-weighting agent matrix slurry a catalytically active component is added, this component comprising a crystalline aluminosilicate.

Suitable crystalline aluminosilicates for use in the composite catalysts of my invention are described in U.S. Pats. 3,140,249, and 3,140,253, both of which are incorporated herein by reference. Representative crystalline aluminosilicates suitable for the present invention include those natural and synthetic crystalline aluminosilicates having uniform pores of a diameter preferably between about 3 and 15 angstrom units. Such crystalline aluminosilicates include a wide variety of aluminosilicates both natural and synthetic which have an amorphous crystalline or combination of crystalline and amorphous structure. However, it has been found that exceptionally superior catalysts can be obtained when the starting aluminosilicate has either a crystalline or a combination of crystalline and amorphous structure and possesses at least 0.4 and preferably 0.6 to 1.0 equivalent of metal cations per gram atom of aluminum. The aluminosilicates can be described as a three-dimensional framework of $SiO_4$ and $AlO_4$ tetrahedra in which the tetrahedra are cross linked by the sharing of oxygen atoms whereby the ratio of total aluminum and silicon atoms to oxygen atoms is 1:2. In their hydrated form, the alumino-silicates may be represented by the formula:

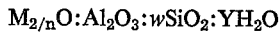

$$M_{2/n}O:Al_2O_3:wSiO_2:YH_2O$$

wherein M represents at least one cation which balances the electrovalence of the tetrahydra, $n$ represents the valence of the cation, $w$ the moles of $SiO_2$ and Y the moles of $H_2O$. The cation can be any or more of a number of metal ions, depending upon whether the aluminosilicate is synthesized or occurs naturally. Typical cations include sodium, lithium, potassium, silver, magnesium, calcium, zinc, barium, iron, nickel, cobalt and manganese. Although the proportions of inorganic oxides in the silicates and their spatial arrangements may vary affecting distinct properties in the aluminosilicate, the main characteristic of these materials is their ability to undergo dehydration without substantially affecting the $SiO_4$ and $AlO_4$ framework.

Aluminosilicates falling within the above formula are well known and include synthesized aluminosilicates, natural aluminosilicates, and certain caustic treated clays. Among the aluminosilicates are included zeolites A, Y, L, D, T, X, levynite, erionite, faujasite, analcite, noselite, phillipsite, brewsterite, datolite, chabazite, gmelinite, leucite, scapolite, mordenite as well as certain caustic treated clays such as montmorillonite and kaolin families. The preferred aluminosilicates are those having pore diameters of at least about 4 angstroms.

Particularly preferred rare earth zeolites for use in this invention may be made by base exchange of sodium zeolite X with rare earth ions to form rare earth zeolite X (see e.g. Plank et al. U.S. Pat. 3,140,249, Example 26), and by base exchange of sodium zeolite Y with rare earth ions to form rare earth zeolite Y (see e.g. Plank et al. application Ser. No. 195,945, filed May 18, 1962, entitled "Catalyst and Conversion of Organic Compounds in the Presence Thereof") as described hereinafter.

Other synthesized crystalline aluminosilicates include those designated as ZK-4, zeolite A and ZK-5.

Other aluminosilicates which can be used are caustic treated clays.

Of the clay materials, montmorillonite and kaolin families are representative types which include the subbentonites, such as bentonite, and the kaolins commonly identified as Dixie, McNamee, Georgia, and Florida clay in which the main mineral constituent is halloysite, kaolinite, dickite, nacrite, or anauxite. Such clays may be used in the raw state as originally mined or initially subjected to calcination, acid treatment or chemical modification. In order to render the clays suitable for use, however, the clay material is treated with sodium hydroxide or potassium hydroxide, preferably in admixture with a source of silica, such as sand, silica gel or sodium silicate, and calcined at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling within the following weight ratios:

| | |
|---|---|
| $Na_2O$/clay (dry basis) | 1.0–6.6 to 1 |
| $SiO_2$/clay (dry basis) | 0.01–3.7 to 1 |
| $H_2O/Na_2O$ (mole ratio) | 35–100 to 1 |

It is to be understood that mixtures of the various aluminosilicates previously set forth can be employed as well as individual aluminosilicates.

Crystalline aluminosilicates having pore diameters between about 3 and 5 angstrom units may be suitable for size-selective conversion catalysis, while crystalline aluminosilicates having pore diameters between about 6 and 15 angstrom units are preferred for hydrocarbon conversion such as catalytic cracking and the like.

The crystalline aluminosilicate particles employed as a component in the catalyst compositions of the present invention are essentially characterized by a high catalytic activity.

This high catalytic activity may be imparted to the particles by base exchanging alkali metal aluminosilicate particles before dispersion thereof in the matrix with a base-exchange solution containing ions selected from the group consisting of cations of elements of Groups I-B-VIII of the Periodic Table, hydrogen, and hydrogen precursors, including mixtures thereof with one another. Hydrogen precursors, such as ammonia and ammonium salts, typically undergo, upon heating, degradation to hydrogen cations in contact with aluminosilicates. Suitable methods of base exchange are described in the aforenoted U.S. Pats. 3,140,249 and 3,140,253.

Where an alkali metal aluminosilicate is employed initially, it is essential to base exchange aluminosilicate particles before compositing with the matrix to reduce the sodium content of the final product to less than about 4% by weight and preferably less than 1% by weight. The sodium content of the final composite is essentially less than 4% by weight. In no instance should there be any more than 0.25 equivalent of alkali metal per gram atom of aluminum associated with the aluminosilicate. Such compositions provide high catalytic activity when zeolite Y is the crystalline aluminosilicate component. Preferably, however, and particularly when zeolite X is the crystalline aluminosilicate component, the sodium content of the final composite should be less than 1% by weight.

As previously discussed, base exchange may be accomplished by one or more contacts with a solution containing ions selected from the group consisting of cations of the elements of Groups I-B-VIII, hydrogen and hydrogen precursors, including mixtures thereof with one another.

It is most preferred that the crystalline aluminosilicate be a rare earth zeolite, that is a crystalline aluminosilicate composition containing rare earth metal cations as a result of treatment with a fluid medium, preferably a liquid medium, containing at least one rare earth metal cation. Rare earth metal salts represent the source of rare earth cation. The product resulting from treatment with a fluid medium is an activated crystalline and/or crystalline-amorphous aluminosilicate in which the structure thereof has been modified primarily to the extent of having the rare earth cations chemisorbed or ionically bonded thereto.

Water is the preferred solvent for the cationic salt, e.g., rare earth metal salt, for reasons of economy and ease of preparation in large scale operations involving continuous or batchwise treatment. Similaarly, for this reason, organic solvents are less preferred but can be employed providing the solvent permits ionization of the cationic salt. Typical solvents include cyclic and acyclic ethers such as dioxane, tetrahydrofuran, ethyl ether, diethyl ether, diisopropyl ether, and the like; ketones, such as acetone and methyl ethyl ketone; esters such as ethyl acetate; alcohols such as ethanol, propanol, butanol, etc.; and miscellaneous solvents such as dimethylformamide, and the like.

In carrying out the treatment with the fluid medium, the procedure employed varies depending upon the particular aluminosilicate which is treated. If the aluminosilicate which is treated has alkali metal cations associated therewith, then the treatment with fluid medium or media should be carried out until such time as the alkali metal cations originally present are substantially exhausted. Alkali metal cations, if present in the treated aluminosilicate, tend to suppress or limit catalytic properties, the activity of which, as a general rule, decreases with increasing content of these metallic cations. On the other hand, if the aluminosilicate which is treated with the desired fluid medium is substantially free of alkali metal cations, i.e. a calcium aluminosilicate, then the treatment need not be carried out until such time as the metal is exhausted since the presence of metals other than alkali metals does not seriously limit catalytic properties. Effective treatment with the fluid medium to obtain a modified aluminosilicate having high catalytic activity will vary, of course, with the duration of the treatment and the temperature at which the treatment is carried out. Elevated temperatures tend to hasten the speed of treatment whereas the dudration thereof varies inversely with the general concentration of ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between 5 and 8. The aluminosilicate material is thereafter analyzed for metallic content by methods well known in the art. Analysis also involves analyzing the effluent wash for anions obtained in the wash as a result of the treatment, as well as determination of and correction for anions that pass into the effluent wash from soluble substances, or decomposition products of insoluble substances, which are otherwise present in the aluminosilicate as impurities.

The treatment of the aluminosilicate with the fluid medium or media may be accomplished in a batchwise or continuous method under atmospheric, superatmospheric or subatmospheric pressures. A solution of rare earth metal cations in the form of a molten material, vapor, aqueous, or non-aqueous solution may be passed slowly through a fixed bed of aluminosilicate. If desired, hydrothermal treatment or corresponding non-aqueous treatment with polar solvents may be effected by introducing the aluminosilicate and fluid medium into a closed vessel maintained under autogeneous pressure. Similarly, treatments involving fusion or vapor phase contact may be employed.

Where a rare earth zeolite is desired, a wide variety of rare earth compounds can be employed with facility as a source of rare earth ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valecates, lactates, malanates, oxalates, palmitates, hydroxides, tartrates, and the like. The only limitation on the particular rare earth metal salt or salts employed is that it be sufficiently soluble in the fluid medium in which it is used to give the necessary rare earth ion transfer. The preferred rare earth salts are the chlorides, nitrates and sulfates.

Representative of the rare earth metals are cerium, lanthanum, praseodymium, neodymium, illinium, samarium, europium, gadolinium, terbium, dysprosium, holmium, erbium, thulium, scandium, yttrium, and lutecium.

The rare earth metal salts employed can either be the salt of a single rare earth metal or mixtures of rare earth metals, such as rare earth chlorides of didymium chlorides. As hereinafter referred to, unless otherwise indicated, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available and the ones specifically referred to in the examples contain the chlorides of the rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides but having a lower cerium content. It consists of the following rare earths determined as oxides: lanthanum 45–56% by weight, cerium 1–2% by weight, praseodymium 9–10% by weight, neodymium 32–33% by weight, samarium 5–7% by weight, gadolinium 3–4% by weight, yttrium 0.4% by weight, and other rare earths 1–2% by weight. It is to be understood that other mixtures of rare earths are also applicable for the preparation of the novel compositions of this invention, although lanthanum, neodymium, praseodymium samarium and gadolinium as well as mixtures of rare earth cations containing a predominant amount of one or more of the above cations are preferred since these metals provide optimum activity for hydrocarbon conversion, including catalytic cracking.

It is preferred that the novel compositions of the present invention have at least 0.4 and more desirably 0.6 to 1.0 equivalent of positive ions per gram atom of aluminum of which at least some are rare earth metal cations. Additionally, in those situations wherein the catalyst composition contains metallic cations other than rare earth metal cations, it is then preferred that they be at least divalent with the cations of divalent metals, such as calcium, magnesium, and manganese being particularly advantageous. Polyvalent metallic ions capable of reduction to lower valence states are also particularly advantageous for dual function catalysts.

A more preferred embodiment of this invention uses rare earth zeolite compositions which have from 0.5 to 1.0 equivalent per gram atom of aluminum of rare earth metal cations. Thus, in the most preferred embodiment of this invention, rare earth metal cations are substantially the only metallic cations associated with the aluminosilicate.

While not wishing to be bound by any theory of operation, it nevertheless appears that the rare earth cations tends to impart stability to the aluminosilicate compositions, thereby rendering them far more useful for catalytic purposes, particularly in hydrocarbon conversion processes such as cracking.

The mean particle size of the crystalline aluminosilicate incorporated into the matrix is advantageously less than about 40 microns. Preferably the particle size is in the range of about 0.1 to 20 microns, and most preferably from about 2 to 10.

The matrix into which the crystalline aluminosilicate is dispersed is prepared in such a manner that, as charged to the cracking unit, the synthetic amorphous oxide gel desirably has a pore volume of at least about 0.6 cc./g., and generally from about 0.6 to 1.5 cc./g. A preferred pore volume range is from about 0.8 to 1.3 cc./g., with the most preferred range being from about 1 to 1.2 cc./g.

Increase in pore size increases the effective diffusivity of the resulting catalyst. Also the increase in pore size gives a material which is a more effective cracking catalyst, particularly with heavy gas oils which generally produce relatively large amounts of coke (e.g. oils having a boiling point range of from about 650 to 1050° F.) and wide cut gas oils having a boiling point range of from about 400 to 1000° F. Catalysts made with the large pore size matrices also have longer effective lives and are more resistant to sintering and resistant to decrease in their effective diffusivity with continued use.

The porosity of the matrix can be adjusted so as to obtain the desired pore volume. Thus, increased porosity may be obtained, for example, by increasing the time and temperature of ageing the silica gel. For a more detailed discussion of such prior art techniques for adjusting porosity, see "Control of Physical Structure of Silica-Alumina Catalyst" by Ashley et al., vol. 44, Industrial and Engineering Chemistry, at pp. 2861–2863 (December 1952).

The aluminosilicate is incorporated into the matrix by preparing a slurry of the fine particles of the crystalline aluminosilicate, preferably in an aqueous medium. Its concentration in its slurry is preferably in the range from about 1 to 40%. The concentration of the matrix in its slurry is preferably in the range of about 1 to 15%. The two slurries are then thoroughly mixed.

Advantageously, the amount of crystalline zeolite in the blended slurry is sufficient to provide a concentration of this component, in the finished catalyst, in the range of about 1 to 80 percent by weight, preferably about 2 to 20 weight percent, and most preferably from about 5 to 15 weight percent.

After mixing, the blend is then filtered to remove water from the slurry and thus improve control of the solids concentration in the slurry going to the spray dryer. This, in turn, provides greater control over the particle size distribution of the particles coming from the spray dryer.

Filtration normally increases the total solids concentration of the blend to over 8%, e.g., typically from about 10 to 12%. Filtration also removes some dissolved salts. Without such filtration, and without the improved control of solids content of the slurry obtained thereby, the particle distribution of the catalyst coming from the spray dryer would vary over a wide range.

The rate of filtration of the slurry is also important inasmuch as the faster the slurry filters, the better is the control over the solid content of the slurry going to the spray dryer. A significant factor affecting the filtration rate of the slurry is the size of the particles in the slurry. The larger the particles, the faster the slurry filters. The smaller the gel particles in the slurry, the slower the filtration time. If the particles are too small, the filtration operation is virtually impossible due to plugging of the filter.

I have discovered that by adjusting the $OH/SiO_2$ molar ratio to from about 0.15 to 0.23, and preferably in the range of from about 0.18 to 0.21 during the preparation of the matrix as hereinabove described, the production of a preponderance of large particles in the slurry can be assured. Consequently, the filtration time of the slurry is minimized.

As referred to herein, filtration time is the time, in seconds, required to develop a crack in the filter cake in a small scale filtration test on the slurry. The filtration time is determined using the type of apparatus and procedure generally described in Chemical Engineers' Handbook, John H. Perry, ed., 4th ed., McGraw-Hill, pub., section 19, p. 59. The exact procedure is as follows: A Dorr-Oliver small scale vacuum filtration testing unit is fitted with a filter leaf having a diameter of 4.3 inches and a surface area of 0.10 square ft. The filter is composed of a filter cloth of monofilament nylon thread No. 10308C obtained from the National Filter Media Co., New Haven, Conn.

The filter leaf, with the filter cloth fitted thereto, and under a vacuum of 24 inches of mercury, is submerged in the matrix slurry for 10 seconds. The filter leaf is removed from the slurry and held with the filter cloth side up. The time required from removal of the filter leaf until the appearance of a crack in the filter cake is the filtration time.

The filtered material is then subdivided and dried to form the desired particles. A particularly good method of making microspherical particles (e.g. of particle size of about 1 to 200 microns, the bulk of which are in the range of about 40 to 80 microns) especially suitable for use in fluidized catalytic cracking, is spray drying, preferably under high pressures, e.g., of the order of from about 200 to 2000 p.s.i.g., and preferably from about 1000 to 1500 p.s.i.g.

The spray drying temperature is ordinarily within the range of 200° F. to 1000° F. The temperature used will depend upon such factors as the quantity of material to be dried and the quantity of air used in the drying. The evaporation rate will vary depending on the quantity of air used in the drying. The temperature of the particles which are being dried is preferably within the range of 150° F. to 300° F. at the completion of the drying.

The drying is preferably effected by a process in which the particles to be dried and a hot air stream are moving in the same direction for the entire drying period (concurrent drying), or where the hot air stream flows in the opposite direction (countercurrent drying), or by semi-counter current dying.

After the dried particles have been formed they are preferably given a wet treatment to further remove alkali metal (which may, for example, be present, at this stage in amount of about 1 to 5%, and more usually from about 1 to 3%, based on the zeolite), by further base exchange with materials capable of providing hydrogen ions. One suitable technique for this purpose is to treat the particles with a solution of ammonium sulfate, e.g., with water containing about 1–5%, of ammonium sulfate to remove sodium ions, and then to wash the particles with water. A series of alternating ammonium sulfate and water treatments may be used, ending with a water wash to remove sulfate ions.

The rare earth-ammonium-zeolite/matrix material is then desirably treated with a solution containing rare earth ions so as to replace ammonium and residual alkali metal with rare earth ions. Desirably the rare earth ions are used as aqueous solutions of water soluble salts thereof, e.g., as rare earth chloride hexahydrate.

The foregoing post exchange is desirably carried out using an equivalent amount of rare earth cation equal to at least 50% of the equivalents of alkali metal, e.g., sodium, present in the crystalline zeolite prior to the wet processing treatment with ammonium ions. Preferably, the equivalent amount of rare earth cation employed is equal to 100% of sodium present, i.e., the full stoichiometric amount required to replace all of the sodium present, or is in excess of the stoichiometric amount required. The rare earth cation may be supplied from a solution having a concentration of about 0.1% to 1% by weight of the soluble salts thereof, for example, a rare earth chloride, although higher concentrations may, of course, be employed. Desirably, the exchange is conducted at a temperature of from about 60 to 120° F. for a time between about 1 and 60 minutes.

The foregoing is followed with one or more water washes to minimize the chloride content of the finished catalyst.

The particles are then dried in any suitable manner, as by air drying at 250° F.

By virtue of the foregoing wet treatment of the dried particles, e.g., with aqueous ammonium sulfate and aqueous rare earth chloride, to further remove alkali metal from the zeolite and matrix, ammonium ions in addition to rare earth cations are introduced. Upon subsequent drying, ammonia is liberated leaving hydrogen ions, so that the zeolite may contain both rare earth metal cations and hydrogen ions, thus resulting in a catalyst having highly desirable characteristics.

The efficiency of this subsequent treatment is greatly improved if the rare earth zeolite, in finely divided condition, is pretempered by subjecting it to dehydrating conditions, as by calcination, to lower its residual moisture content to a value within the range of 0.3 to 6%, more preferably within the range of 1.5 to 6%, such pretempering being effected before the rare earth zeolite is brought into contact with the matrix. As a result of this pretempering the rare earth zeolite can be later exchanged to a lower sodium content much more easily, it becomes more resistant to loss of crystallinity on contact with acidic media and the relative crystallinity of the final product is higher. In addition, the rare earth component becomes more fixed in the crystalline aluminosilicate and more resistant to removal on subsequent base exchanges.

Suitable pretempering conditions are, for example, a temperature of about 650° F. in air for about 60 minutes or a temperature of about 1500° F. in air for about 10 minutes, or a treatment with superheated steam at about 1100–1200° F. at 15 p.s.i.g. for from about 10 to 60 minutes; a preferred treatment is at atmospheric pressure at a temperature of about 1050–1250° F. in steam, air, or a steam-air mixture for from about 10 to 60 minutes. (This pretempering technique is described more fully in U.S. application Ser. No. 459,687, filed May 28, 1965, entitled "Improved Crystalline Zeolites and Method of Preparing Same.")

The finished catalyst is characterized by a residual sodium content not in excess of about 0.5 weight percent, expressed as $Na_2O$, based upon the weight of the dried catalyst. Indeed, a catalyst having a residual sodium content not in excess of about 0.2 weight percent $Na_2O$ may readily be attained, and where the dispersed rare earth zeolite is of the X form (as contrasted to rare earth zeolite Y) the residual sodium level is preferred to be not in excess of about 0.1 weight percent $Na_2O$.

As pointed out previously, it is highly advantageous that the synthetic amorphous oxide gel component of the matrix be such that, if utilized alone, it would be characterized by substantially no catalytic activity, i.e., have an alpha ($\alpha$) value of less than 0.1, and preferably less than 0.05.

The term "alpha" is well recognized in the art as designating relative catalytic activity. See, in particular, the definition of alpha by P. B. Weisz and J. N. Miale appearing in the Journal of Catalysis, vol. 4, No. 4 (August 1965) at pp. 525–529. In the present application reference to "alpha" and to tests for determining alpha values is as defined in the foregoing Weisz and Miale article.

Crystalline aluminosilicate components have been found to have alphas in the range of between about 0.5 to substantially greater than 10,000. Conventional cracking catalysts and other amorphous materials have exhibited alphas generally in the range of about 0.1 to 2.0. By way of contrast, the synthetic amorphous oxide gel component of my composite catalyst is desirably characterized (based on its use alone) by an alpha ($\alpha$) value of less than 0.1, and preferably by an alpha value of less than about 0.05.

The catalysts of this invention can, by a relatively mild heat treatment, be put in a highly active condition in which they are suitable for direct use in fluid catalytic cracking and in which they exhibit the desired selectivity for producing gasolines, mainly at the expense of the undesirable products of cracking, e.g., dry gas and coke. This heat treatment can take place during regular cracking-regeneration cycles. Thus, when the catalysts are added, as makeup, in an operating fluid catalytic cracking installation they will soon attain their desired selectivity after a few cracking-regeneration cycles, without the need of a preliminary steam-activating step. Alternatively, the catalysts may be given a preliminary heat treatment in air (and in fluidized condition) at a temperature of 1100–1400° F. for from about 3 to 16 hours.

The following examples will further illustrate my invention.

EXAMPLES 1–9

A series of nine catalysts were prepared, each having the following composition: 10% rare earth Y crystalline aluminosilicate zeolite (REY) plus 90% matrix, the matrix being made up of 40% clay, 57% silica, 2% zirconia, and 1% alumina.

The procedure employed in preparing the nine catalysts was as follows: 1600 grams of Georgia kaoline clay on a dry weight basis were mixed with 110 pounds of deionized water. 7954 grams of Q-brand sodium silicate $[Na_2O(SiO_2)_{3.3}]$ were added to the water-clay slurry with stirring over a period of one half hour. The clay was uniformly dispersed and coated with sodium silicate. The admixture was then heated to 120° F., and concentrated sulfuric acid was added at a uniform rate, while mixing, over a one hour period.

The amount of sulfuric acid added varied depending upon the particular $OH/SiO_2$ molar ratio desired. In Examples 1, 4 and 7, 250 cc. of sulfuric acid (96.0 weight percent) were added to thereby provide an $OH/SiO_2$ molar ratio of 0.36; in Examples 2, 5 and 8, 404 cc. of sulfuric acid were added to thereby provide an $OH/SiO_2$ molar ratio of 0.21; and in Examples 3, 6 and 9, 442 cc. of sulfuric acid were added to thereby provide an $OH/SiO_2$ molar ratio of 0.18.

After the foregoing acid addition, in each instance, the admixture was heat aged at 140° F. for a period of two hours. An aqueous solution of aluminum sulfate (20 weight percent aluminum sulfate) was then added to the aged admixture at a uniform rate over a period of one half an hour in such amount as to provide a final alumina content of 1.0 weight percent, based on the total dry catalyst weight.

A slurry of sodium zirconium silicate ($Na_2ZrSiO_5$) in sulfuric acid, this slurry having a pH less than 0.4, was added at a uniform rate over a period of one half an hour in such amount as to provide a final concentration of zirconia ($ZrO_2$) of 2.0 weight percent, based on the weight of the dry catalyst.

The pH of the mixture was then adjusted to between 4.5 and 4.6 by the addition of concentrated sulfuric acid (96.0%) over a one half hour period.

444 grams of REY (68% exchanged; i.e., 68% of the sodium content had been replaced with rare earth cations), which previously had been pretempered by calcining at about 1200° F. for about ten minutes were slurried in 1400 cc. of deionized water. (The REY had the follownig composition: $Al_2O_3=19.9\%$; $SiO_2=60.3\%$; $(RE)_2O_3=15.5\%$; $Na_2O=4.3\%$.) This slurry was added to the silica-alumina-zirconia-clay slurry while mixing, in such amount as to provide a final REY concentration, based on the dry weight of the catalyst, of 10% by weight.

The blend was homogenized and then filtered. The filtration time was measured. For those catalysts wherein the $OH/SiO_2$ molar ratio was 0.36, i.e., the catalysts of Example 1, 4 and 7, the filtration time was 15 seconds. By contrast, the filtration time for those catalysts wherein the $OH/SiO_2$ molar ratio was 0.21, i.e., the catalysts of Examples 2, 5 and 8, the filtration time was only nine seconds. For those catalysts wherein the $OH/SiO_2$ molar ratio was 0.18, i.e., the catalysts of Example 3, 6 and 9, the filtration time was only weight seconds.

The filter cake was spray dried (inlet gas to spray drier at 800° F. and outlet gas at about 300–325° F.) to produce microspheres of about 1 to 140 microns in diameter, with an average particle size of about 62 microns.

The dried product was twice slurried with water, allowed to settle, and the water decanted. The product was then exchanged with 20 gallons of 5% ammonium sulfate solution and then washed with deionized water until substantially free of sulfate ions. The sulfate-free product was exchanged with 140 grams of rare earth chloride in 14,000 cc. of water and then water washed until essentially chloride free. The product was then dried at 250° F.

Samples of each of catalysts 1-9 were subjected to thermal treatments of varying degrees of severity. Thus, the catalysts of Examples 1-3 were calcined for three hours at 1725° F. in air. The catalysts of Examples 4-6 were subjected to mild steaming, i.e., steaming for four hours at 1400° F. and 0 p.s.i.g. The catalysts of Examples 7-9 were subjected to more severe steaming, i.e., steaming for five hours at 1400° F. and at 15 p.s.i.g.

After the foregoing heat treatment, each of the catalysts was then evaluated for catalytic performance, using FCC Bench Tests at 925° F., WCMCGO, 2.4 minutes-on-stream, with a catalyst:oil ratio of 3. The results of these tests are set out in Table 1.

TABLE 1

| | Example number | | | | | | | | |
|---|---|---|---|---|---|---|---|---|---|
| | 1 | 2 | 3 | 4 | 5 | 6 | 7 | 8 | 9 |
| $OH/SiO_2$, molar ratio | 0.36 | 0.21 | 0.18 | 0.36 | 0.21 | 0.18 | 0.36 | 0.21 | 0.18 |
| Alumina in matrix, percent wt. | 1 | 1 | 1 | 1 | 1 | 1 | 1 | 1 | 1 |
| Filtration time, sec. | 15 | 9 | 8 | | | | | | |
| Treatment of catalyst | Calcined 3 hrs. at 1,725° F., w./air | | | Steamed 4 hrs./ 1,400° F./0 p.s.i.g. | | | Steamed 4 hrs./ 1,400° F./15 p.s.i.g. | | |
| Bench FCC test: 925° F., WCMCCO, 2.4 min-on-stream, C/O | 3 | | | 3 | | | 3 | | |
| Conversion, percent vol | 79.8 | 77.9 | 80.8 | 76.2 | 76.5 | 74.0 | 59.1 | 54.9 | 57.1 |
| $C_5+$ gasoline, percent vol | 62.1 | 63.9 | 61.9 | 64.1 | 64.2 | 61.5 | 49.6 | 47.0 | 49.2 |
| Total $C_4$'s, percent vol | 18.7 | 15.9 | 18.1 | 15.8 | 15.8 | 16.3 | 10.8 | 9.4 | 9.9 |
| Dry gas, percent wt | 8.4 | 7.8 | 8.7 | 5.9 | 6.3 | 6.0 | 5.3 | 5.2 | 5.0 |
| Coke, percent wt | 4.7 | 4.1 | 5.3 | 3.2 | 2.8 | 2.6 | 2.6 | 2.0 | 5.0 |
| C on catalyst at end, percent wt | 1.35 | 1.16 | 1.50 | 0.90 | 0.81 | 0.75 | 0.73 | 0.58 | 0.64 |
| Hydrogen factor | 57 | 89 | 57 | 40 | 34 | 38 | 33 | 30 | 36 |
| Physical properties: | | | | | | | | | |
| Pore vol., cc./g. | 0.63 | 0.62 | 0.59 | 0.68 | 0.62 | 0.61 | 0.64 | 0.57 | 0.56 |
| Packed density, g./cc. | 0.52 | 0.51 | 0.50 | 0.50 | 0.53 | 0.53 | 0.51 | 0.52 | 0.55 |
| Surface area, m.²/g | 234 | 238 | 262 | 181 | 191 | 188 | 124 | 119 | 127 |
| Chemical properties: | | | | | | | | | |
| $Na_2O$, percent wt | 0.07 | 0.04 | 0.07 | | | | | | |
| $RE_2O_3$, percent wt | 3.3 | 3.0 | 2.7 | | | | | | |
| $ZrO_2$, percent wt | 1.94 | 1.94 | 1.87 | | | | | | |

Referring to the data in Table 1, Examples 1-3, the markedly lower filtration time attained in each of Examples 2 and 3, namely 9 and 8 seconds, respectively, as compared to that for Example 1, 15 seconds, is readily apparent.

Referring to Examples 4-6, it will be noted that in Examples 5 and 6 the amount of coke, expressed as weight percent, was, respectively, 2.8 and 2.6 weight percent. This compares most favorably with a coking of 3.2 weight percent for the catalyst of Example 4.

Referring finally to Examples 7-9, the same trend in coke make is readily apparent. Thus, in Examples 8 and 9, the percent coke was 2.0 and 2.2, respectively, whereas the percent coke for Example 7 was 2.6 percent.

EXAMPLES 10-15

A second series of catalysts was prepared. In this series, unlike the first series of Examples 1-9, the matrix contained no alumina. Thus, the catalysts of this series had the following compositions: 10% rare earth crystalline aluminosilicate zeolite (REY) plus 90% matrix containing 40% clay, 58% silica, and 2% zirconia.

With respect to catalysts made up of rare earth crystalline aluminosilicate zeolite particles dispersed in a silicious matrix, e.g., a matrix of silica and clay, heretofore it had been thought to be necessary that the silicious portion thereof contain a minor amount, e.g., 1 percent, of alumina. Typically the matrix would comprise silica, alumina, and clay. While the alumina tended to a slight degree, to adversely affect the catalyst performance in the sense that the coke make was higher than desired, alumina was nevertheless deemed necessary inasmuch as its presence was found to decrease the filtration time. As previously noted, I have found that if in the preparation of the matrix the $OH/SiO_2$ molar ratio is adjusted to about 0.18 to 0.21 prior to heat ageing, then one can obtain desirably low filtration times, yet without the necessity of incorporating alumina into the matrix. Moreover, such desirably low filtration times are attained without adversely affecting catalyst performance, e.g., coke make, which adverse affect had been heretofore observed when the matrix did contain alumina.

In the present Examples 10-15, wherein the matrix contained no alumina, the $OH/SiO_2$ molar ratio was adjusted to either 0.21 (Examples 10, 12 and 14) or 0.18 (Examples 11, 13 and 15).

The procedure employed in preparing the catalysts of Examples 10-15 was as follows. 1600 grams of Georgia kaolin clay on a dry weight basis were mixed with 88 pounds of deionized water. 8093 grams of Q-brand sodium silicate $[Na_2O(SiO_2)_{3.3}]$ were added with stirring over a one half hour period. The clay was uniformly dispersed and coated with sodium silicate. The admixture was then heated to about 120 F., and concentrated sulfuric acid (96.8 weight percent sulfuric acid) was added at a uniform rate over a period of one half hour, while mixing. For the catalysts of Examples 10, 12 and 14, sufficient sulfuric acid was added to adjust the $OH/SiO_2$ molar ratio to 0.21. For Examples 11, 13, and 15, the amount of sulfuric acid added was such as to adjust the $OH/SiO_2$ molar ratio to 0.18.

After the foregoing acid addition, the admixture was heat aged at 140° F. for a period of two hours. A slurry of sodium zirconium silicate $(Na_2ZrSiO_5)$ in sulfuric acid, this slurry having a pH of less than 0.4, was added at a uniform rate over a one half hour period in such amount as to provide a final zirconia $(ZrO_2)$ concentration of 2% by weight of the dry catalyst.

The pH of the mixture was then adjusted to between 4.5 and 4.6 by the addition of sulfuric acid over a one half hour period. A dispersion of 68% exchanged REY was added to the mixture (the REY having been pretempered as described in Examples 1-9), in such amount as to provide a final REY concentration based on the dry weight of the catalyst, of 10 weight percent.

The mixture was then homogenized and filtered as described in the previous examples. The filtration times for the three catalysts wherein the $OH/SiO_2$ molar ratio was 0.21 (Examples 10, 12 and 14) was 10 seconds. The same filtration time of 10 seconds was observed for those catalysts wherein the molar $OH/SiO_2$ ratio was 0.18 (Examples 11, 13 and 15).

15

Thereafter, the product was spray dried as described in the preceding examples, and was then twice slurried with water, allowed to settle, and the water decanted. This product was then continuously washed with 20 gallons of 5% ammonium sulfate solution and water washed until substantially free of sulfate ion. The sulfate-free product was exchanged with 140 grams of rare earth chloride in 1400 cc. of water and water washed until essentially chloride free. The product was then dried at 250° F.

The catalysts of Examples 10–15 were subjected to heat activation in a manner similar to that described for Examples 1–9. Thus, the catalysts of Examples 10 and 11 were subjected to dry thermal heating by calcining for three hours at 1725° F. in air; the catalysts of Examples 12 and 13, to mild steaming, by steaming for four hours at 1400° F. and 0 p.s.i.g.; and the catalysts of Examples 14 and 15, to relatively severe steaming, by steaming for five hours at 1400° F. and 15 p.s.i.g.

Each of the catalysts was then evaluated for catalytic activity using the FCC Bench Test described in Examples 1–9. The results are set out in Table 2.

16

16 was Georgia kaolin clay; in the catalyst of Example 17 the weighting agent was zircon (zirconium silicate); and in the catalyst of Example 18 the weighting agent was alpha alumina. The catalysts were prepared by adding 1600 (water free basis at 1400° F.) grams of weighting agent to 70 pounds of deionized water and mixing the whole thoroughly. 8083 grams of Q-brand sodium silicate $[Na_2O(SiO_2)_{3.3}]$ were then added to the water-weighting agent slurry. The sodium silicate was added slowly over a period of 30 minutes while mixing. The weighting agent was uniformly dispersed and coated with sodium silicate. The whole was then heated to 120° F. and the $OH/SiO_2$ molar ratio was adjusted to 0.21 by the addition, with mixing, of 415 cc. of sulfuric acid (concentration=96.8%) over a 30 minute period. The whole was then heated to 140° F. and held there for two hours. An aqueous solution of zirconium sulfate (prepared from 178 grams sodium zirconium silicate, 1730 cc. deionized water and 115 cc. concentrated sulfuric acid), this solution containing about 242 grams of $Zr(SO_4)_2$ was slowly added over a 30 minute period in such amount as to result in a $ZrO_2$ level in the matrix of the finished cata-

TABLE 2

| | Example number | | | | | |
|---|---|---|---|---|---|---|
| | 10 | 11 | 12 | 13 | 14 | 15 |
| $OH/SiO_2$, molar ratio | 0.21 | 0.18 | 0.21 | 0.18 | 0.21 | 0.18 |
| Alumina in matrix, percent wt | 0 | 0 | 0 | 0 | 0 | 0 |
| Filtration time, sec | 10 | 10 | | | | |
| Treatment of catalyst | Calcined 3 hrs. at 1,725° F. w./air. | | Steamed 4 hrs./1,400° F./0 p.s.i.g. | | Steamed 5 hrs./1,400° F./15 p.s.i.g. | |
| Bench FCC test: 925° F., WCMCCO, 2.4 min.-on-stream, C/O | 3 | | 3 | | 3 | |
| Conversion, percent vol | 80.9 | 77.6 | 76.6 | 78.5 | 64.0 | 64.9 |
| $C_5+$ gasoline, percent vol | 65.5 | 64.2 | 74.7 | 64.7 | 55.6 | 54.3 |
| Total $C_4$'s, percent vol | 17.0 | 15.3 | 14.6 | 17.3 | 11.3 | 13.0 |
| Dry gas, percent wt | 7.9 | 7.4 | 6.9 | 7.4 | 5.3 | 5.7 |
| Coke, percent wt | 3.7 | 3.5 | 2.5 | 2.6 | 2.0 | 2.3 |
| C on catalyst at end, percent wt | 1.04 | 0.98 | 0.73 | 0.75 | 0.55 | 0.64 |
| Hydrogen factor | 46 | 61 | 49 | 35 | 25 | 28 |
| Physical properties: | | | | | | |
| Pore vol., cc./g | 0.61 | 0.57 | 0.62 | 0.58 | 0.58 | 0.56 |
| Packed density, g./cc | 0.54 | 0.56 | 0.56 | 0.57 | 0.56 | 0.59 |
| Surface area, m²./g | 273 | 271 | 210 | 218 | 146 | 147 |
| Chemical properties: | | | | | | |
| $Na_2O$, percent wt | 0.07 | 0.07 | | | | |
| $RE_2O_3$, percent wt | 2.7 | 3.2 | | | | |
| $ZrO_2$, percent wt | 1.8 | 1.8 | | | | |

Referring to Examples 10 and 11, as previously noted, the filtration time was excellent, namely, 10 seconds. This filtration time compares most favorably with the 15 second filtration time that resulted in Example 1, Table 1, wherein the matrix contained one percent alumina and wherein the $OH/SiO_2$ molar ratio was 0.36. Indeed, this ten second filtration time also compares quite favorably with the filtration times of 9 and 8 seconds, respectively, for Examples 2 and 3 of Table 1, wherein the $OH/SiO_2$ molar ratios were 0.21 and 0.18, respectively, for a matrix containing one percent alumina.

The amount of coke, expressed as weight percent, was 3.7 for Example 10, 3.5 for Example 11, both of which values compare favorably with the 4.7 weight percent value for the catalyst of Example 1.

Referring to Examples 12 and 13, the relatively low coke values, 2.5 and 2.6 weight percent respectively, compared most favorably with 3.2 weight value for the catalyst of Example 4, as well as with the 2.8 and 2.6 values for the catalysts of Examples 5 and 6, respectively.

Finally, considering Examples 14 and 15, here also the present coke values of 2.0 and 2.3, respectively, compare favorably with the value of 2.6 percent for the catalyst of Example 7.

EXAMPLES 16–18

A third series of catalysts were prepared using identical methods of preparation for each, the only difference being that the weighting agent in the catalyst of Example lyst of about 2.0 weight percent, expressed on a dry basis. 156 cc. concentrated sulfuric acid were added over a 30 minute period so as to lower the pH to 4.5. 458 grams REY (68% exchanged, i.e., 60% of the sodium content had been replaced with rare earth cations), which previously had been pretempered in calcining at about 1200° F. for about 10 minutes, were slurried in 1400 cc. of deionized water. The REY had the following composition:

| | Percent |
|---|---|
| $Al_2O_3$ | 19.9 |
| $SiO_2$ | 60.3 |
| $(RE)_2O_3$ | 15.5 |
| $Na_2O$ | 4.3 |

This slurry was added to the foregoing silica-zirconia synthetic matrix-weighting agent slurry slowly while mixing. The blend was homogenized, spray dried (inlet gas to spray dryer about 800° F., and outlet gases about 300° to 325° F.), to produce microspheres from about 1 to 140 microns in diameter, with an average particle size of about 62 microns. The spray-dried particles were then slurried with water, permitted to settle, and the water was decanted. This procedure was then repeated. The particles were then treated with a 5% aqueous solution of ammonium sulfate at about 90° F. and water washed until the effluent was free of sulfate ions. The material was then exchanged with rare earth chloride solution (140 grams $RECl_3 \cdot 6H_2O$ in 1400 cc. of deionized water)

and water washed free of chloride. The product was air-dried at 250° F. and then the catalysts were pre-tempered by steaming for four hours at 1400° F. in 0 p.s.i.g. steam.

The catalysts were evaluated for catalytic performance in cracking Wide Cut Mid-Continent Gas Oil.

The results obtained are set forth hereinafter in Table 3.

TABLE 3

| | Example | | |
|---|---|---|---|
| | 16 | 17 | 18 |
| Bench FCC test: 925° F C/O, 2.4 min, on stream.. | 3 | 3 | 3 |
| Conversion, percent vol | 76.6 | 73.1 | 73.6 |
| $C_5$+gasoline, percent vol | 64.7 | 64.6 | 63.9 |
| Total $C_4$'s, percent vol | 14.6 | 13.0 | 13.6 |
| Dry gas, percent wt | 6.9 | 5.6 | 6.0 |
| Coke, percent wt | 2.5 | 2.1 | 2.2 |
| C on catalyst at end, percent wt | 0.73 | 0.60 | 0.62 |
| Physical porperties: | | | |
| Pore volume, cc./g.[1] | 1.03 | 1.05 | 0.80 |
| Packed density, g./cc.[2] | 0.56 | 0.58 | 0.58 |
| Surface area, m.²/g | 210 | 203 | 210 |
| Chemical analysis, percent wt.: | | | |
| $Na_2O$ | 0.07 | 0.08 | 0.08 |
| $RE_2O_3$ | 2.7 | 2.5 | 2.6 |
| Percent REY in catalyst | 10 | 10 | 10 |

[1] Pore volume of synthetic portion of matrix after 3 hour—1,200° F.— air treatment.
[2] For overall catalyst composite.

From the data in Table 3, it is clear that improved results, i.e., reduced coke make, are obtained when the catalyst contains a weighting agent other than clay.

Variations can, of course, be made without departing from the spirit of my invention.

Having thus described my invention, what I desire to secure and claim by Letters Patent is:

1. A process for cracking a hydrocarbon charge stock which comprises contacting the same under catalytic cracking conditions with a catalyst prepared by:
    (a) admixing an alkali metal silicate with a particulate weighting agent selected from the group consisting of clay, alpha-alumina, zircon, mullite, alumina monohydrate, alumina trihydrate, halloysite, sand, titania, silicon, aluminum and titanium to coat said particles with said alkali metal silicate;
    (b) adding an acid to the resulting admixture in an amount sufficient to adjust the ratio of moles of hydroxide to moles of $SiO_2$ to from about 0.15 to 0.23;
    (c) heat aging the admixture at a temperature from about 90 to 200° F.;
    (d) reducing the pH of the aged admixture from a higher value to a pH in the approximate range of 4 to 7 to form a siliceous gel-weighting agent matrix;
    (e) admixing a particulate crystalline aluminosilicate with said matrix so as to disperse said aluminosilicate particles to form a composite, and
    (f) drying the composite in the form of particles suitable for introduction into a fluid catalytic conversion zone.

2. The process of claim 1 wherein after said heat aging and prior to reducing the pH, a source of aluminum ions, zirconium ions or a mixture thereof is added.

3. The process of claim 1 wherein said heat aging step is carried out at a temperature of about 100 to 160° F. for from about 1 to 6 hours.

4. The process of claim 1 wherein the adjustment of the $OH/SiO_2$ molar ratio and the reduction of said pH to from about 4 to 7 are carried out by the addition of sulfuric acid.

5. The process of claim 1 wherein said weighting agent is kaolin clay, alpha-alumina or zircon.

6. The process of claim 1 wherein said crystalline aluminosilicate particles are either crystalline Y aluminosilicate or crystalline X aluminosilicate, said crystalline aluminosilicate having been base exchanged with a solution of cations selected from the group consisting of the cations of elements of Groups I-B-VIII of the Periodic Table, hydrogen, hydrogen precursors and mixtures thereof with one another.

7. The process of claim 1 wherein said cations are rare earth cations.

8. The process of claim 1 wherein said ratio of moles of hydroxide to moles of $SiO_2$ is from about 0.18 to 0.21.

9. The process of claim 1 wherein after admixing said aluminosilicate particles to form said composite, said composite is separated and spray dried to produce composite particles having a particle size of from about 1 to 200 microns.

10. The process of claim 1 wherein, after said drying step (f), said composite particles are first ion exchanged with ammonium ions to reduce the alkali metal content of said composite, and then ion exchanged with a solution containing rare earth ions to substantially remove ammonium ions and residual alkali metal ions therefrom and replace such ions with rare earth ions.

References Cited
UNITED STATES PATENTS

| 3,140,253 | 7/1964 | Plank et al. | 208—120 |
| 3,406,124 | 10/1968 | Eastwood et al. | 252—455 |
| 3,449,265 | 6/1969 | Gladrow et al. | 252—455 |
| 3,553,104 | 1/1971 | Stober et al. | 208—120 |

DELBERT E. GANTZ, Primary Examiner
G. E. SCHMITKONS, Assistant Examiner

U.S. Cl. X.R.
208—DIG. 2; 252—440, 448, 477 R

PO-1050
(5/69)

UNITED STATES PATENT OFFICE
CERTIFICATE OF CORRECTION

Patent No. U. S. 3,775,299     Dated November 27, 1973

Inventor(s) Leonard S. Hepner

It is certified that error appears in the above-identified patent and that said Letters Patent are hereby corrected as shown below:

| | |
|---|---|
| Column 1, line 19 | "OH/Sio$_2$" should be --OH/SiO$_2$-- |
| Column 5, line 35 | "tetrahydra" should be --tetrahedra-- |
| Column 12, line 71 | "weight" should be --eight-- |
| Column 15, Table 2 Example 12 C$_5^+$ Gasoline, % vol | "74.7" should be --64.7-- |
| Column 17, line 21 Table 3 | "Ma$_2$O" should be --Na$_2$O-- |

Signed and sealed this 23rd day of April 1974.

(SEAL)
Attest:

EDWARD M.FLETCHER,JR.
Attesting Officer

C. MARSHALL DANN
Commissioner of Patents